United States Patent [19]

Tellert et al.

[11] 4,354,082
[45] Oct. 12, 1982

[54] COOKING VESSEL FOR AN INDUCTION COOKING APPLIANCE

[75] Inventors: Rudy Tellert, Schweinfurt; Wolfgang Fischer, Königsberg, both of Fed. Rep. of Germany

[73] Assignee: Sachs-Systemtechnik GmbH, Schweinfurt, Fed. Rep. of Germany

[21] Appl. No.: 121,306

[22] Filed: Feb. 13, 1980

[30] Foreign Application Priority Data

Feb. 22, 1979 [DE] Fed. Rep. of Germany ....... 2906912

[51] Int. Cl.³ .............................. H05B 6/08; H05B 6/12
[52] U.S. Cl. ............................ 219/10.49 R; 219/10.77; 219/10.79
[58] Field of Search .................. 219/10.49 R, 10.79, 219/10.77, 10.75; 428/926, 928, 931, 685, 683, 653

[56] References Cited

U.S. PATENT DOCUMENTS

| | | | |
|---|---|---|---|
| 3,786,222 | 1/1974 | Harnden et al. | 219/10.49 R |
| 3,928,744 | 12/1975 | Hibino et al. | 219/10.49 R |
| 3,966,426 | 6/1976 | McCoy et al. | 219/10.49 R |

FOREIGN PATENT DOCUMENTS

| | | | |
|---|---|---|---|
| 1439467 | 6/1976 | United Kingdom . | |
| 1522383 | 8/1978 | United Kingdom . | |
| 2010054 | 6/1979 | United Kingdom | 219/10.49 R |

Primary Examiner—B. A. Reynolds
Assistant Examiner—Philip H. Leung
Attorney, Agent, or Firm—Toren, McGeady & Stanger

[57] ABSTRACT

Disclosed is a cooking vessel for use with an induction heating appliance. The vessel bottom is formed at least partly of a non-magnetic conductive layer which, when coupled to a coil of the appliance, detunes the appliance's resonant circuit. The layer has a thickness of less than about 0.2 mm when the resistivity of the layer is less than $0.035 \times 10^{-6}$ Ωm, and a thickness greater than 0.2 mm when the resistivity is higher than about $0.035 \times 10^{-6}$ Ωm.

17 Claims, 20 Drawing Figures

COOKING VESSEL FOR AN INDUCTION COOKING APPLIANCE

REFERENCE TO RELATED APPLICATION

This application is related to the application of Rudi Tellert (Ser. No. 109,183), filed in the U.S. Patent and Trademark Office on Jan. 2, 1980, and assigned to the same assignee as this application.

BACKGROUND OF THE INVENTION

This invention relates to a cooking vessel, particularly one having a bottom of an electrically conductive, non-magnetic material which can be coupled to the resonant circuit coil of an induction cooking or heating appliance.

Cooking or heating appliances of this type generate eddy currents electromagnetically in the bottom of the cooking vessel. The electrically conductive, non-magnetic material at the vessel bottom is usually composed of copper and serves as a heat conducting layer which has the purpose of uniformly distributing the heat, which is generated only in limited areas, over the bottom of the vessel.

The cooking vessel coupled to the resonant circuit coil corresponds to a load resistance which dampens the resonant circuit of the cooking appliance. In conventional cooking vessels, this load resistance is essentially ohmic. It has been found that the non-load power consumption of the resonant circuit network can be reduced and the loaded output which can be obtained from the resonant circuit network can be increased when the load of the cooking vessel has a complex impedance composed of resistive and reactive components by means of which the resonant circuit network is not only dampened, (i.e., the Q reduced,) but the resonant frequency or frequencies also shifted or detuned by the cooking vessel.

This principle is used in the appliance described in the aforementioned copending application of Rudi Tellert. This induction cooking appliance includes a sine wave generator in which a parallel resonant circuit is connected, in series with a series resonant circuit, to a square wave voltage generator. The cooking vessel can be coupled to the parallel resonant circuit. The resonant frequency of the parallel resonant circuit is essentially equal to the fundamental frequency of the square wave voltage generator and lower than the resonant frequency of the series resonant circuit. In this case, to be able to keep the non-load losses as low as possible, and to obtain a relatively high efficiency together with correspondingly low switching losses while loaded, the resonant frequency of the series resonant circuit is selected to be lower than the frequency of the third harmonic of the fundamental frequency of the square wave voltage generator. The resonant circuits and/or the complex load impedance composed of resistive and reactive components of the cooking vessel are dimensioned in such a way that, while the system is loaded, a phase displacement of about 20° to 40°, preferably 30°, is obtained between the square wave voltage and the fundamental frequency component of the output current of the square wave voltage generator. The sum of the fundamental frequency component which is out of phase when the circuit is loaded, and the third harmonic which is continually, inductively out of phase by 90° is no-load as well as load conditions, results in an output current from the square wave voltage generator which is almost rectangular and which lags the square wave voltage by 30°. Accordingly, the square wave voltage generator is terminated almost ohmically (i.e., resistively,) while loaded, and delivers a maximum output to the resonant circuit network. During no-load, it produces a minimum output because the parallel resonant circuit adjusted to the fundamental frequency of the square wave voltage generator is blocked.

An object of the present invention is to improve inductively heated cooking vessels.

Another object of the invention is to provide a cooking vessel for an induction heating or cooking appliance, particularly an appliance of the type described above, in the aforementioned patent application, in which the resonant circuit network of this cooking appliance is shifted or detuned relative to the no-load condition so that optimum conditions prevail for extracting the output.

SUMMARY OF THE INVENTION

In accordance with the present invention, these objects are attained by giving the non-magnetic sheet, plate, or layer that forms a compensating layer or sheet which shifts or detunes the resonant circuit network of the cooking appliance, a thickness of less than about 0.2 mm when its specific electric resistance (i.e., resistivity,) is smaller than about $0.035 \times 10^{-6}$ $\Omega$m, or a thickness of more than 0.2 mm when its specific electrical resistance or resistivity is higher than about $0.035 \times 10^{-6}$ $\Omega$m. Compensating layers or sheets dimensioned within these limits have complex impedances that significantly displace the resonant frequencies of the resonant circuit network. In this manner, in cooking appliances of the type described in the aforementioned application, phase displacements of about 30°, e.g., 20° to 40° can be obtained between the square wave output voltage and the basic frequency component of the output current of the square wave voltage generator.

According to another feature of the invention, the compensating layer has a thickness of between about 15 to 100 $\mu$m, when its specific resistance is between about $0.015 \times 10^{-6}$ and $0.03 \times 10^{-6}$ $\Omega$m. Materials of this kind are highly conductive metals, for example, silver, copper or aluminum. In electrically less conductive metals, the compensating layer should have a thickness of between about 0.3 to 2 mm. Materials that can be used within this range are, for example, brass, nickel, chromium or fine steel. Especially suitable is non-magnetic fine steel (chromium/nickel steel), for example, steel according to German industrial standards DIN 4306 and 4571, in which case the compensating layer has a thickness of about 1.5 mm.

According to another feature of the invention, the vessel bottom of the cooking vessel consists essentially of the material forming the compensating layer.

According to yet another feature of the invention, the cooking vessel is composed of another material, for example, a ferromagnetic material, such as normal steel, or of a non-conductive material, such as glass, ceramic or porcelain, and the compensating layer is arranged on one of the faces of the vessel bottom, preferably, the outer face.

The eddy currents are essentially induced in an annular zone of the vessel bottom. Therefore, according to another feature of the invention, the compensating layer also has an annular shape and is arranged in the region of this annular zone.

According to another feature of the invention, a heat conductive layer is arranged on the bottom of the vessel and a layer of magnetic material on the latter. This avoids the effect of the temperature not being uniformly distributed over the vessel bottom. The temperature is highest in the annular zone.

In embodiments in which the vessel bottom not only forms a complex load impedance for the resonant circuit network, this feature results in uniform heat distribution over the entire vessel bottom without negatively affecting this formation of a complex load.

According to another feature, the heat conducting layer assumes the function of the compensating layer when it is composed of an electrically conductive material and the thickness of the layer of the magnetic material is chosen small enough so that the magnetic field can pass through to the heat conducting layer to an extent sufficient for compensation. In this case, the layer of magnetic material is arranged on the outer side of the heat conducting layer. According to one feature, it is composed of a metal foil or a sheet metal having magnetic properties and preferably a thickness of between 0.05 to 0.2 mm. Particularly suitable for this layer is stainless steel having magnetic properties, for example, chromium steel according to German industrial standard DIN 4016. The heat conducting layer is composed of a highly heat conductive metal, for example, aluminum or copper.

Another way of ensuring good heat distribution resides in the fact that the layer of magnetic material forms a shielding layer for the magnetic field and is arranged between the heat conducting layer and the compensating layer located on the outer face. The screening layer preferably has a thickness of from 0.3 to 1.5 mm.

According to another embodiment, the outer face of the walls and/or bottom of the cooking vessel is coated with a non-conductive, non-magnetic heat insulating material. This heat insulating layer reduces heat losses due to radiation so that the cooking efficiency of the entire system is improved.

In the following, embodiments of the invention will be explained in more detail with the aid of the drawings.

DESCRIPTION OF PREFERRED EMBODIMENTS

Figure 1:
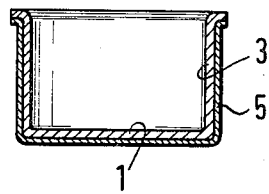
FIGS. 1 to 11 show various embodiments of cooking vessels for an induction cooking appliance, particularly an induction cooking appliance as it is described in the aforementioned patent application.

FIG. 1 shows a cooking vessel, for example, a cooking pot, whose vessel bottom 1 and vessel walls 3 are composed of non-magnetic chromium/nickel fine (or high grade) steel according to German industrial standards DIN 4306 and DIN 4571. The vessel bottom 1 has a thickness of 0.5 to 2 mm, preferably 1.5 mm. The bottom 1 has a resistivity higher than $0.035 \times 10^{-6}$ $\Omega$m. The outer faces of the vessel bottom 1 and the vessel walls 3 are coated with a layer 5 of an electrically insulating, non-magnetic and poorly heat conductive material which prevents losses due to heat radiation. According to one embodiment of the invention, the layer 5 is omitted. On the other hand, the layers may be provided in all of the embodiments described below.

Figure 2:
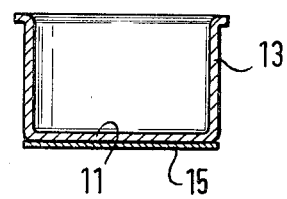

FIG. 2 shows a cooking pot whose vessel bottom 11 and vessel walls 13 are composed of a magnetic material, for example, stainless magnetic steel or iron. A compensating layer 15, arranged on the vessel bottom 11 is composed of a non-magnetic metal. The compensating layer 15 has a thickness of less than 0.2 mm when its specific electric resistance is lower than $0.035 \times 10^{-6}$ $\Omega$m, or a thickness of more than 0.2 mm when its specific electric resistance is larger than about $0.35 \times 10^{-6}$ $\Omega$m. The compensating layer 15 is composed of, for example, silver, copper or aluminum with a thickness of from 15 to 100 $\mu$m. However, a 0.3 to 2 mm thick coating of glass, nickel, chromium or fine steel is also available.

Figure 3:
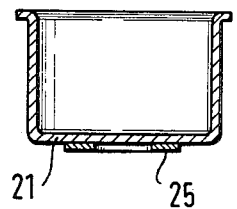

FIG. 3 shows an embodiment which, in essence, merely differs from the above embodiment of FIG. 2 in that an annular compensating layer 25 is arranged on the vessel bottom 21 of the cooking pot. The compensating layer 25 is dimensioned in the same manner as the compensating layer 15 and is composed of the same materials with the same resistivity.

Figure 4:
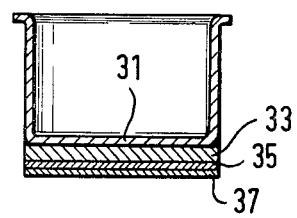

The induction cooking appliance generates eddy currents which are not uniformly distributed over the bottom. The eddy currents, and thus, the temperature of the vessel bottom are at a maximum in an annular zone which is covered by the compensating layer 25 according to FIG. 3 and decreases inwardly as well as outwardly. To ensure uniform heat distribution, the outer face of the vessel bottom 31 of the cooking pot of FIG. 4 is provided with a heat conducting layer 33 of a highly heat conductive metal, for example, copper or aluminum. The heat conductive layer 33 carries a screening layer 35 of magnetic material, for example, iron with a thickness of 0.3 to 1.5 cm, which serves to screen the heat conducting layer 33 from the magnetic field generated by the resonant circuit coil of the cooking appliance. The outer face of the screen layer 35 covered with a compensating layer 37 which is dimensioned in accordance with the compensating layer 15 of the embodiment according to FIG. 2 is composed of the same materials with the same resistivity.

Figure 5:
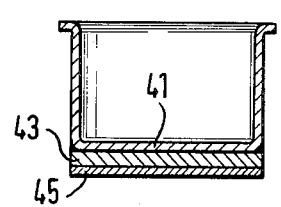

FIG. 5 also shows a cooking vessel whose vessel bottom 41 carries a heat conducting layer 43 similar to the heat conducting layer 33 of FIG. 4. The heat conducting layer 43 is covered with a layer 45 of magnetic material, for example, in the form of a metal foil or a sheet metal having a thickness of about 0.05 to 0.2 mm. The layer 45 is dimensioned so that a portion of the magnetic field can pass through the layer 45 and penetrate into the metallic heat-conducting layer composed of, for example, aluminum or copper. In this case, the heat-conducting layer 43 assumes the function of the compensating layer. The layer 45 preferably composed of stainless, magnetic steel, for example, chrome steel according to German industrial standard DIN 4016.

Figure 6:
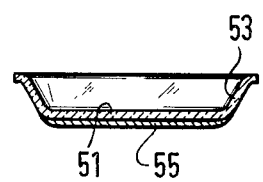
Figure 7:
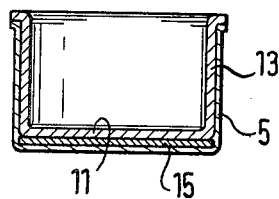
Figure 8:
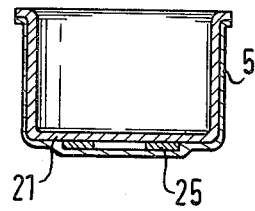
Figure 9:
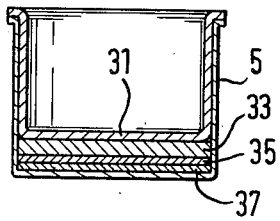
Figure 10:
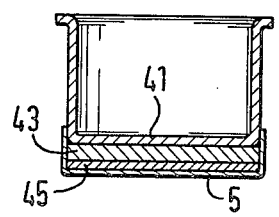
Figure 11:
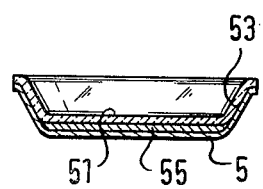

The embodiments according to FIGS. 1 to 5 show cooking vessels of metal. FIG. 6 shows a non-metallic, fireproof cooking vessel whose vessel bottom 51 and vessel walls 52 consist, for example, of glass, ceramic, porcelain or the like. The vessel bottom 51 is covered with a compensating layer 55 which is dimensioned in accordance with the compensating layer 15 of FIG. 2 and is composed of the same materials.

FIGS. 7 to 11 illustrate vessels corresponding to the vessels of FIGS. 2 to 6 covered with the layer 5 of FIG. 1.

In the above description, the term "bottom" or "vessel bottom" has been used in the sense of the layer which faces the inside of the cooking vessel, namely, the layers 1, 11, 21, 31, 41, and 51. The term "layer" has been used throughout the specification to refer not only to the particular layers but also to the embodiment of FIG. 1 without the layer 5, wherein the bottom 1 is also referred to as a layer.

The various compositions of the materials mentioned herein are, in the preferred embodiments, composed substantially only of these compositions. However, according to other embodiments, they may vary from these compositions although they retain the particular characteristics needed in this environment.

Figure 12:
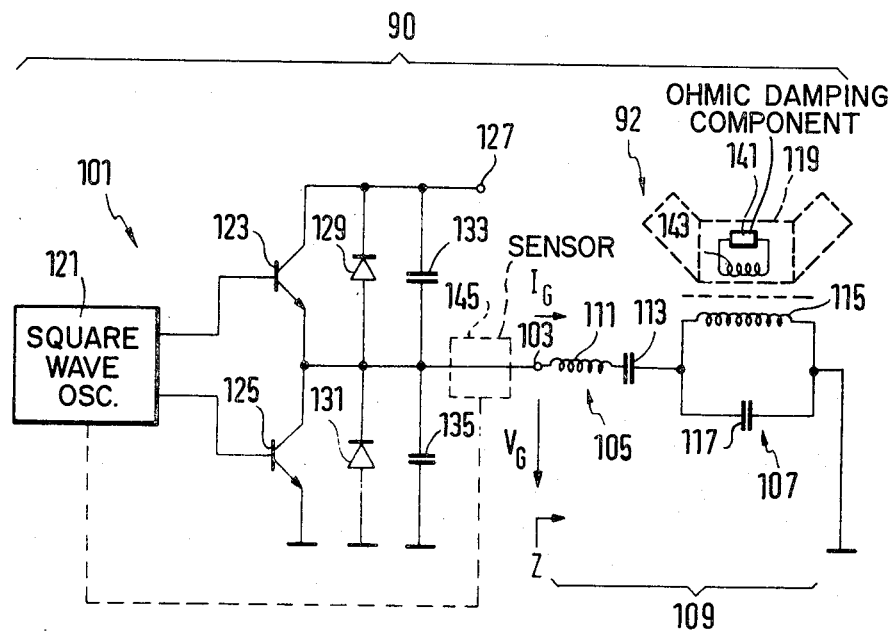
FIG. 12 is a partially schematic, partially block diagram illustrating the electrical components of a heating apparatus and a cooking vessel which represents any one of the heating vessels in FIGS. 1 to 11 and embodying features of the invention.

FIG. 12 illustrates an induction heating apparatus 90 together with a cooking vessel 92 which represents any one of the heating vessels in FIGS. 1 to 11 and embodiments thereof.

The apparatus 90 includes a square wave voltage generator 101 between whose output connection 103 and the ground is connected a network 109. The latter is composed of a series resonant circuit 105 connected in series with a parallel resonant circuit 107. The series resonant circuit 105 comprises a coil 111 and a capacitor 113; the parallel resonant circuit 107 is formed by a coil 115 and a capacitor 117 and is connected to ground. When in use, the apparatus 90 is coupled inductively to the vessel 92 which forms a load at a coil 115. The latter induces eddy currents in the appropriate parts of the vessel.

The square wave voltage generator includes a free-running square wave control oscillator 121 which alternately switches push-pull connected switching transistors 123 and 125, so that a transistor becomes conductive only when the previously conductive transistor has again reached its off state. The collector-emitter paths of the transistors are connected in series between a positive operating voltage source 127 and ground. Connected parallel to the collector-emitter paths in the transistors 123 and 125 are respective free-wheeling diodes 129 and 131, each connected in the blocking direction, i.e., forming an anti-parallel free-wheeling diode, and respective capacitors 133 and 135.

Figure 13:
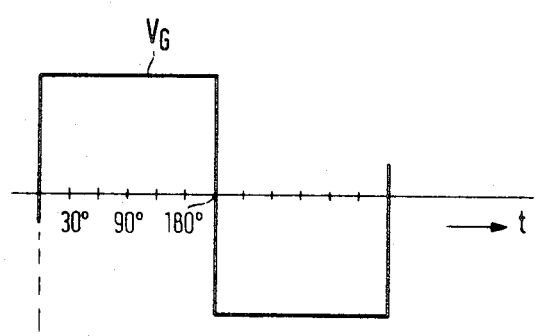
FIG. 13 is a voltage diagram of the output of a voltage generator in FIG. 12.

The power drain on the square wave voltage generator 1 should be as low as possible during no-load operation, i.e., when the vessel 119 is uncoupled. When the load 119 is coupled to the coil 115, the switching losses of the transistor 123 and 125 should be as low as possible and the power supplied to the coil 115 should be as high as possible. The square wave voltage generator 101 delivers a square wave voltage $V_G$ between the connection 103 and ground. The square wave voltage $V_G$ varying in dependence on time t is illustrated in FIG. 13. A current $I_G$ flows into the network 109. Its shape over time is dependent on the complex, frequency-dependent impedance Z of the network 109 and is composed of the basic (i.e., fundamental,) frequency component $f_0$ of the square wave voltage $V_G$ determined by the control oscillator 121 and the current component of the harmonics of the basic frequency $f_0$. Of these components, in addition to the basic frequency component, the most significant is the current component of the third harmonic $3f_0$ of the basic frequency $f_0$. In order to keep the basic frequency component of the current $I_G$ as low as possible during no-load operation, the unloaded parallel resonant circuit 107 is adjusted to the basic frequency $f_0$. As a result, the no-load losses are essentially determined by the impedance of the network to the third harmonic $3f_0$.

Figure 14:
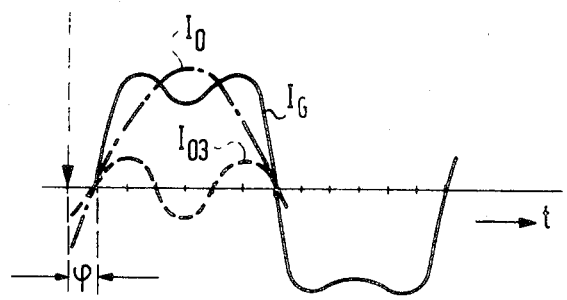
FIG. 14 is a graph illustrating currents, and frequency components thereof, flowing to a network in FIG. 12.
Figure 15:
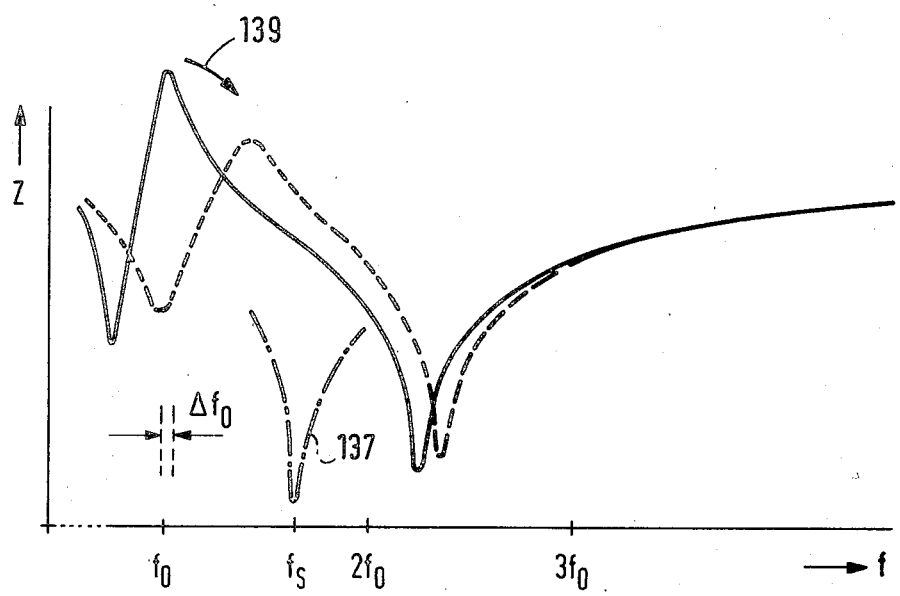
FIG. 15 is an impedance frequency graph illustrating the magnitude of the complex impedance of a network in FIG. 12 with respect to frequency.

On the one hand, the resonant frequency of the series resonant circuit selected is to be higher than the basic frequency $f_0$ and smaller than the third harmonic of the basic frequency, i.e., smaller than $3f_0$. As a result, the magnitude of the complex impedance Z of the network 109, in principle, exhibits the shape depending on the frequency f illustrated in FIG. 15. In the no-load condition, indicated by the solid line, the magnitude of the impedance becomes a maximum at the basic frequency $f_0$ of the square wave voltage generator, because of the parallel resonance of the parallel resonant circuit 108. A minimum magnitude occurs at lower as well as at higher frequencies. The minimum at frequencies lower than the parallel resonance maximum is created by the series resonance of the parallel resonant circuit 107 which is capacitive at this frequency with the series resonant circuit 105 which is inductive at this frequency. The magnitude of the impedance of the series resonant circuit 105 alone is illustrated in FIG. 15 by the dash-dot curve 137. This dimensioning of the series resonant circuit 105 causes the phase $\phi_Z$ of the impedance Z of the network 109, which impedance varies with respect to frequency, as illustrated in FIG. 14 by a solid line for no-load operation always to be 90° inductive at frequencies of the third harmonic, i.e., at $3f_0$. The corresponding current component $I_{03}$ is shown in a broken line in FIG. 14. Due to the constant phase conditions of the network 109 at the frequency $3f_0$, the phase of the current component $I_{03}$ is constant relative to the square wave voltage $V_G$.

The efficiency of the square wave voltage generator 101 reaches a maximum when the impedance Z is essentially ohmic, to wit, the square wave voltage $V_G$ generates a square wave current $I_G$ with essentially equal phases.

Figure 16:
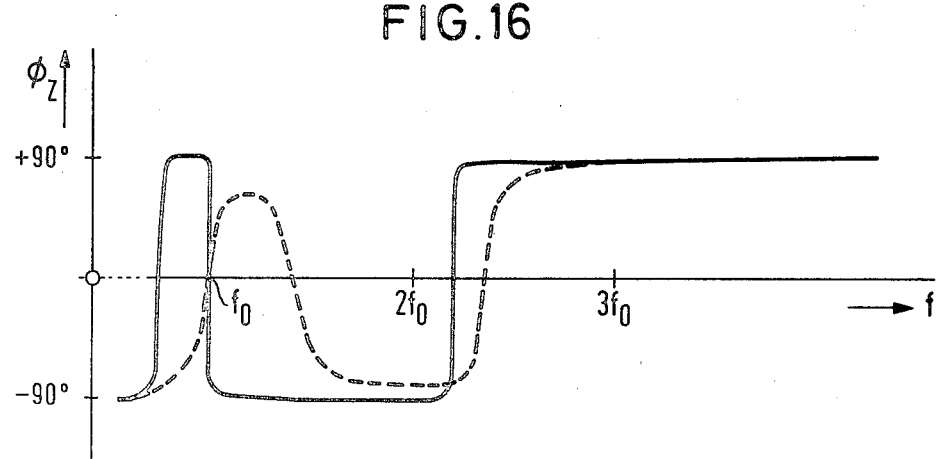
FIG. 16 is a phase frequency diagram illustrating the phases of the impedance of a network in FIG. 12 before and after de-tuning by the cooking vessel.

Staggering or detuning the parallel resonant circuit 107 inductively displaces the basic component $I_0$ of the generator current under load by a phase angle $\phi = 30°$ relative to the square wave voltage $V_G$. In FIG. 14, the basic component $I_0$ is shown as a dash-dot line. Superposing the 30° out-of-phase current $I_0$ and the current $I_{03}$ results in an approximately rectangular or trapezoidal generator current $I_G$ which in its totality is inductively out-of-phase by 30° relative to the square wave voltage $V_G$. The value or the phase of the impedance Z of the network 109 resulting from detuning the parallel resonant circuit 107 by the load 119 is shown in broken lines in FIGS. 15 and 16. In FIG. 15, an arrow 139 indicates the direction in which the maximum of the parallel resonance shifts towards higher frequencies. The resonant circuits are arranged so that the load 119 detunes the parallel circuit lower-frequency minimum occuring at the fundamental frequency f₀, at which the impedance for the fundamental frequency component $I_0$ of the generator current $I_G$ reaches a maximum. This corresponds to a resonance step-up.

To detune the parallel resonant circuit 107, the load also comprises an inductive component 143 in addition to an ohmic i.e., merely damping component 141. The inductive component of the load impedance is supplied by the aforementioned suitable selection of the material of the cooking appliance to be inductively coupled to the coil 115; however, an additional coil, not shown, can be connected in parallel with the coil 115 by a switch. Suitable materials are those previously mentioned.

The leakage power generated in the transistors 123 and 125 during the switching procedure may be relatively high when the square wave voltage $V_G$ has already been switched to a high level while a relatively high current $I_G$ still flows through the transistor. Due to the phase displacement of the current edges relative to the voltage edges, the capacitors 133 and 135 not only reduce the switching losses created when the transistors are switched off, but also the transistor losses when they are switched on. When being switched off, the capacitors slow down an excessively quick voltage rise in the transistors so that these transistors are free of load carriers in the range of low voltage. Accordingly, this results in leakage power which is practically insignificant. Moreover, as a result of the out-of-phase current, the square wave voltages not only go back to zero potential, but are driven to the opposite potential by the reactive currents of the capacitor. The voltage is prevented from oscillating beyond the zero potential by the diodes 129, 131.

Figures 17, 18, 19:
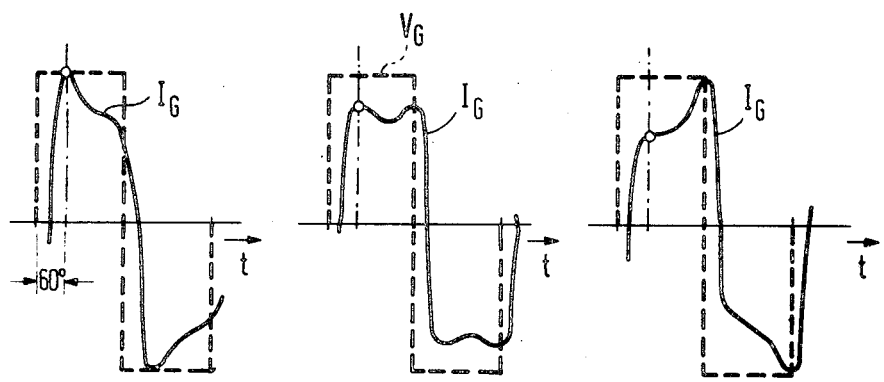
FIGS. 17 to 19 are graphs illustrating output voltages and deviations of generator currents for the circuit in FIG. 12.

The power which can be drawn from the coil 115 can be controlled by modifying the basic frequency f₀ of the square wave voltage generator 121. For generating the control voltage, the voltage at the parallel resonant circuit 107 or the power intake of the load 119 can be utilized. In FIG. 12, the shape over time of the generator current $I_G$ is detected by means of a sensor 145 and is utilized for controlling the basic frequency f₀ of the square wave voltage generator 121. FIGS. 17 through 19 show the shape over time of the generator current $I_G$ for different basic frequencies f₀. In FIG. 18, the square wave voltage generator 121 is adjusted to that frequency at which the desired trapezoidal shape over time of the current results. FIGS. 17 and 19 show the deviations of the generator current $I_G$ from the nominal shape when the generator frequency is reduced or increased. For generating the control voltage, the current amplitude is utilized at the time of a maximum of the current component of the third harmonic on which this third component is superposed in the same direction as the basic frequency component of the current. Such a case occurs, for example, when the phase is displaced by 60° relative to the square wave voltage.

Figure 20:
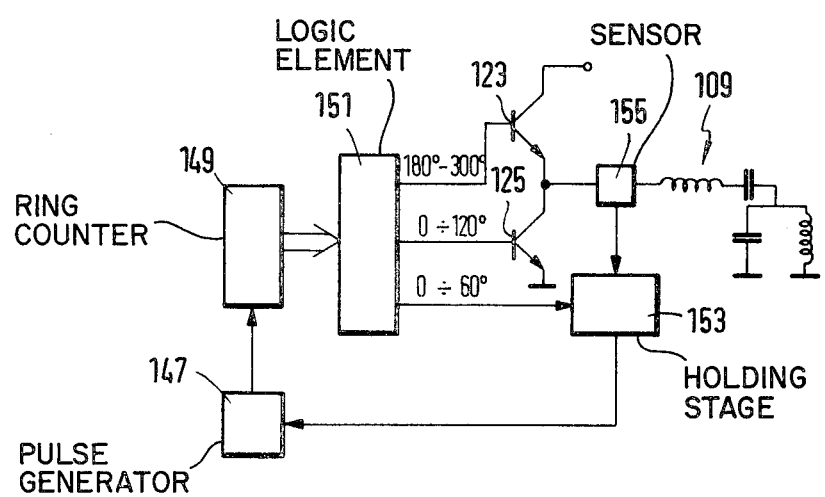
FIG. 20 is a partially block and partially circuit diagram illustrating a power control circuit embodying features of the invention.

A circuit arrangement suitable for power control is illustrated in FIG. 20. A free-running pulse generator 147 is connected to a ring counter 149 whose counter outputs control a logic element 151. The logic element 151 has three outputs, the first of which, in a phase range of 0° to 60°, generates an output signal which controls a stop or holding stage 151. The two other outputs are effective in the phase ranges 0° to 120° and, 180° to 300° and in intervals control the transistors 123 and 125. A holding stage 153 is connected to a current sensor 155 which is coupled, for example, through a transformer to the generator current flowing to the network 109 so that the holding stage 153 stores the maximum amplitude of the generator current occuring in the phase angle range of 0° to 60°. The output signal of the holding stage 153 corresponding to the maximum amplitude forms a narrower signal, which corresponds to the deviation of the generator frequency from the nominal value and is delivered to the pulse generator 147 for controlling the frequency.

In a specific embodiment, the network 109 has the following parameters:

| Coil 111: | 77μH |
|---|---|
| Capacitor 113: | 0.2μF |
| Coil 115: | 160μH |
| Capacitor 117: | 0.3μF |

While specific embodiments of the invention have been described in detail, it will be evident to those skilled in the art that the invention may be otherwise embodied without departing from its spirit and scope.

We claim:

1. An induction cooking arrangement, comprising:
    an induction cooking appliance, including a square wave voltage generator, a series resonant circuit whose resonant frequency is lower than the frequency of the third harmonic of the fundamental frequency of said square wave voltage generator, a parallel resonant circuit coupled in series with said series resonant circuit, the resonant frequency of said parallel resonant circuit being substantially equal to the fundamental frequency of said square wave voltage generator and smaller than the resonant frequency of said series resonant circuit, and
    a cooking vessel including walls and a bottom, said bottom including an eddy current induction layer composed of a conductive, non-magnetic material coupleable to said parallel resonant circuit, the thickness of said eddy current induction layer for generation of a load phase displacement of approximately 20° to 40° between the square wave output voltage and the fundamental frequency component of the output current of said square wave voltage generator, the induction layer having one of a number of constructions with a specific electrical resistance less than $0.035 \times 10^{-6}$ Ωm or more than $0.035 \times 10^{-6}$ Ωm, and thinner than 0.2 mm for a construction whose specific electric resistance of the material of the eddy current induction layer is smaller than $0.035 \times 10^{-6}$ Ωm, and thicker than 0.2 mm for a construction whose specific electric resistance is greater than $0.035 \times 10^{-6}$ Ωm.

2. A vessel according to claim 1, wherein said induction layer has a thickness of between 15 to 100 μm when its specific resistance is between about $0.015 \times 10^{-6}$ Ωm and $0.03 \times 10^{-6}$ Ωm.

3. A vessel according to claim 1, wherein said induction layer has a thickness of between about 0.3 to 2 mm and the specific electrical resistance is more than $0.035 \times 10^{-6}$ Ωm.

4. A cooking vessel according to claim 1, wherein said vessel bottom essentially consists completely of non-magnetic noble steel forming said induction layer.

5. A vessel according to claim 1, wherein said vessel bottom includes a magnetic material carrying said induction layer on one side.

6. A vessel according to claim 5, wherein said inductor layer has an annular shape.

7. A vessel according to claim 1, wherein said vessel bottom includes a heat conducting layer with a layer of magnetic material on the heat conducting layer.

8. A vessel according to claim 7, wherein said heat conducting layer is composed of an electrically conductive material, and the thickness of said layer of magnetic material is sufficiently small to permit the magnetic field to pass through to said heat conducting layer to an extent sufficient for said induction layer to detune the resonant circuit.

9. A vessel according to claim 8, wherein said layer of magnetic material has a thickness of between about 0.05 to 0.2 mm.

10. A vessel according to claim 7, wherein said layer of magnetic material forms a shielding layer for the magnetic field and is arranged between said heat conducting layer and said induction layer, said induction layer being the outermost of said layers.

11. A vessel according to claim 10, wherein said shielding layer has a thickness of between about 0.3 to 1.5 mm.

12. A vessel according to claim 7, wherein said magnetic layer is composed of stainless magnetic steel.

13. A vessel according to claim 1 or 7, wherein the outer sides of said vessel walls are coated with a non-conductive, non-magnetic heat insulating material.

14. A vessel according to claim 1 or 7, wherein said bottom and said walls includes a portion of non-magnetic, non-conductive material.

15. A vessel according to claim 14, wherein a portion of the bottom and said walls is composed of glass or ceramic or porcelain.

16. A vessel according to claim 1 or 7, wherein the outer sides of said vessel bottom is coated with a non-conductive and non-magnetic heat insulating material.

17. A vessel according to claim 1 or 7, wherein the outer sides of said vessel walls and said vessel bottom are coated with a non-conductive and non-magnetic heat insulating material.

* * * * *